Feb. 23, 1926.
H. W. SWEET
1,574,315
MOUNTING FOR GEAR SHIFTING LEVERS
Filed May 26, 1925
3 Sheets-Sheet 1

Fig. 1.

INVENTOR.
Henry W. Sweet
BY
Parsons Bradle
ATTORNEYS.

Feb. 23, 1926.  1,574,315
H. W. SWEET
MOUNTING FOR GEAR SHIFTING LEVERS
Filed May 26, 1925  3 Sheets-Sheet 2
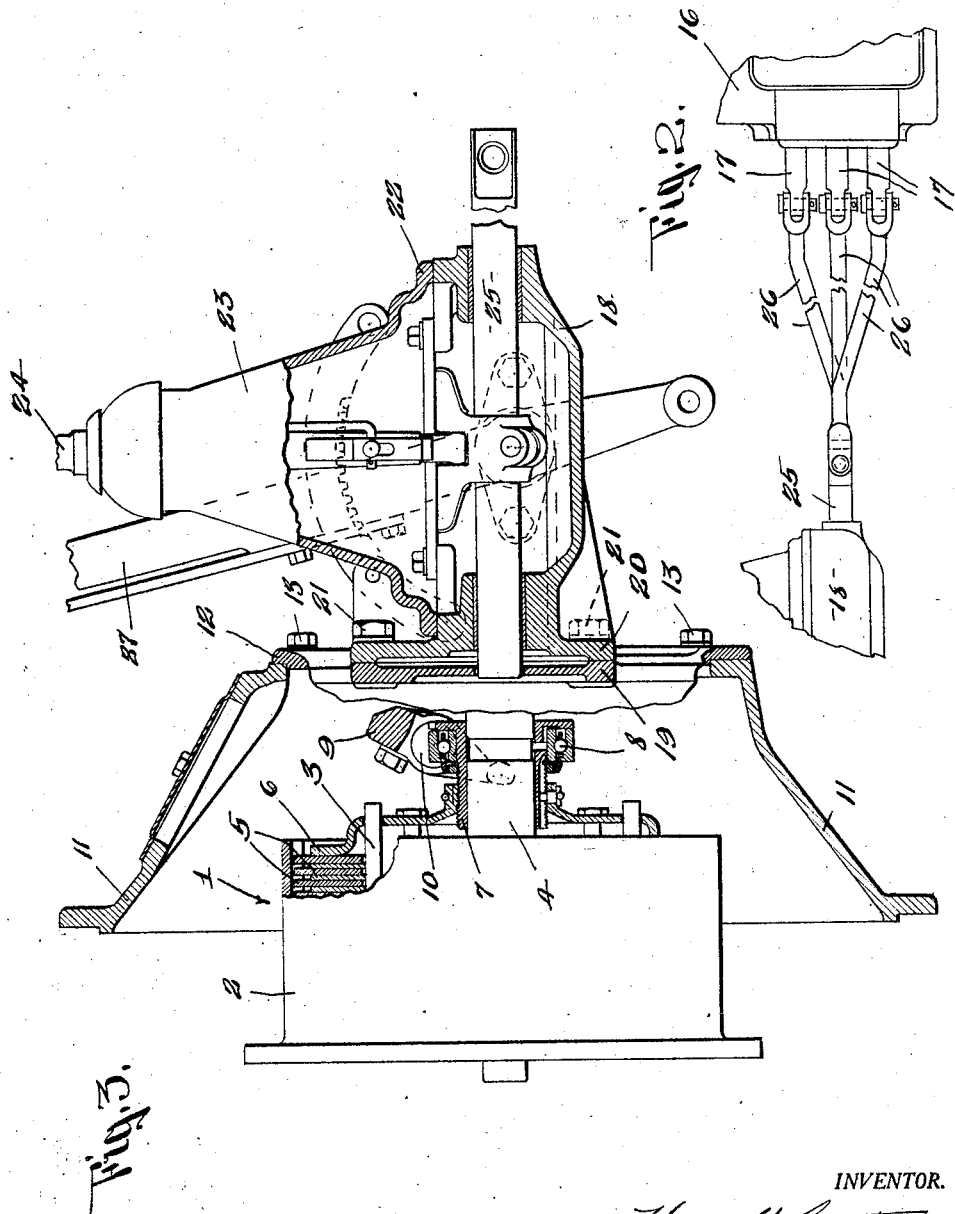
INVENTOR.
Henry W. Sweet
BY
ATTORNEYS.

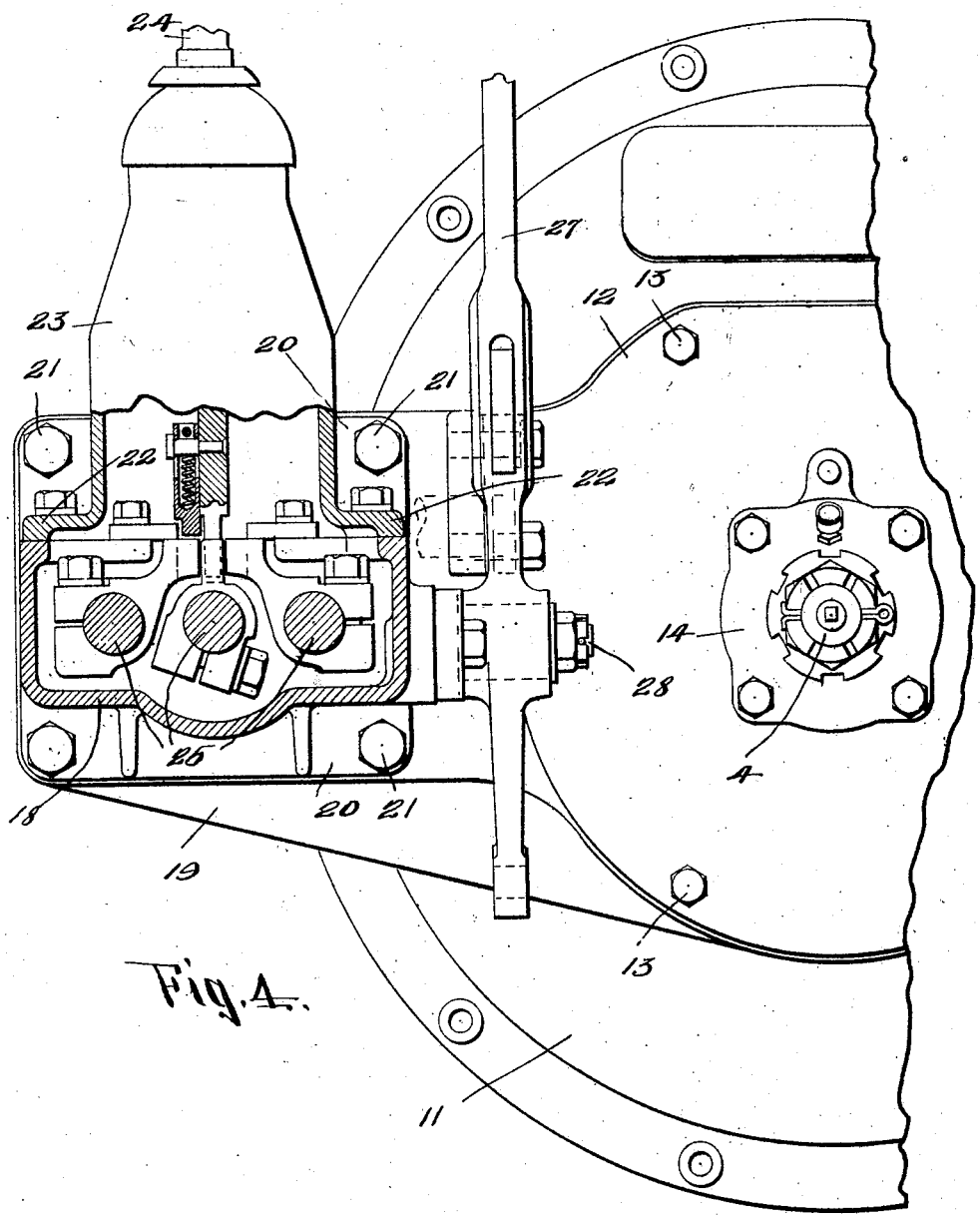

Patented Feb. 23, 1926.

1,574,315

UNITED STATES PATENT OFFICE.

HENRY W. SWEET, OF SYRACUSE, NEW YORK, ASSIGNOR TO BROWN-LIPE GEAR COMPANY, OF SYRACUSE, NEW YORK, A CORPORATION OF NEW YORK.

MOUNTING FOR GEAR-SHIFTING LEVERS.

Application filed May 26, 1925. Serial No. 33,018.

*To all whom it may concern:*

Be it known that I, HENRY W. SWEET, a citizen of the United States, and a resident of Syracuse, in the county of Onondaga and State of New York, have invented a certain new and useful Mounting for Gear-Shifting Levers, of which the following is a specification.

This invention relates to transmission mechanism, such as are used in motor vehicles, and has for its object a particularly simple and efficient construction whereby the operating means for the change speed gearing, as a gear shifting lever can be located comparatively low relatively to the floor of the vehicle, in which the transmission mechanism is embodied.

The invention consists in the novel features and in the combinations and constructions hereinafter set forth and claimed.

In describing this invention, reference is had to the accompanying drawings in which like characters designate corresponding parts in all the views.

Figure 1 is a diagrammatic plan view of this mechanism showing the relative arrangement and location of the clutch, transmission gearing and operating means for the gearing.

Figure 2 is a fragmentary diagrammatic side elevation of parts seen in Figure 1.

Fig. 3 is a vertical sectional view, partly broken away, taken on the plane of line 3—3, Figure 1.

Figure 4 is a sectional view taken on line 4—4, Figure 1, parts being omitted.

This transmission mechanism comprises generally a main clutch and housing or case therefor, a change speed gearing located in the rear of the clutch and spaced apart therefrom, and including shiftable members, and means for shifting said members, comprising a support mounted between the clutch case and the gear case, and supported on one of said cases, and also located at one side of the axial line of the clutch, selecting and shifting lever mechanism carried by the support, and connections between such mechanism and the shiftable members of the gearing.

1 designates the clutch which may be of any suitable form, size and construction, it being here shown as of the multiple disk type, and including an outer drum 2, an inner drum 3, rotatable with the clutch shaft 4, interleaved disks 5 interposed between the drums and a shiftable member or pressure plate 6, mounted on a sleeve 7 slidable on the shaft 4, the sleeve having a throw-out bearing 8 with which coacts a yoke 9 mounted on a shaft 10 journalled in the clutch housing 11.

The drum 2 as will be understood by those skilled in the art, is connected to the engine shaft, and is usually mounted on the flywheel of the engine.

The clutch case 11 is formed with a detachable rear wall or plate 12 held in position in any suitable manner as by cap screws 13. The plate 12 carries a suitable bearing for the rear end of the shaft 4, this bearing being contained within a bearing cap 14. The shaft 4 is connected by a shaft 15 to the drive shaft of the gearing.

16 designates the box or case of the gearing in which the drive shaft 15 and other shafts and gears are mounted.

A change speed gear is usually of the selective type and may be of any well known form, size and construction, and the shiftable gears or clutches thereof are shifted by members as slide rods 17, slidably mounted in the casing 16 and extending through the front wall thereof toward the clutch case 11. The construction of the clutch and the gearing per se forms no part of this invention.

This invention includes gear shifting mechanism so located that it does not project above or projects a very slight distance above the floor of the vehicle in which the transmission mechanism is located.

18 designates the support for the operating mechanism for the change speed gearing, this being here shown as mounted upon the clutch case at one side of the axis of the shaft 4 or at one side of the shaft 15. This support comprises a base mountable at the side of the rear wall 12 of the clutch case, the rear clutch case 11 being formed with a laterally extending bracket 19, and the base of the support 18 being formed with a flange 20 abutting said bracket 19 and secured thereto as by cap screws 21. In addition to the base the support 18 comprises a cap 22 detachably mounted on the base and having an upward hollow extension 23, in the upper end of which the selecting and shifting lever 24 is fulcrumed to have a lateral selecting movement as well as a fore and aft shifting movement.

The lever 24 coacts with slide rods 25 suitably mounted in the base of the support 18, to slide forwardly and rearwardly therein, these slide rods corresponding in number to the shifter rods 17 of the gearing. The rods 25 are here shown as arranged in a horizontal plane and the rods 17 in a vertical plane, and the rods 25 are connected to the rods 17 by links 26 suitably pivoted at each end to the rods 25 and the rods 17. Preferably, a brake lever 27 is mounted on a stud 28 carried by the support 18 between the support and the shaft 15.

The coaction of the lever 24 and the rods 25 whereby the rods are selected and shifted forms no part of this invention.

Obviously, owing to the location of the gear shifting mechanism or support 18 therefor, at one side of the axis of the clutch or at the side of the shaft 15, the fulcrum point for the gear shifting lever is located comparatively low with respect to the tops of the gear and clutch cases, and with respect to the floor of the vehicle in which the transmission mechanism is embodied.

Also owing to the fact that the support 18 for the gear shifting mechanism is detachably mounted upon the rear wall of the clutch casing it can be readily assembled on the clutch case and removed and replaced and is also a unit with the clutch casing which as will be understood by those skilled in the art, is mounted upon or secured to the engine casing and is a unit therewith.

What I claim is:

1. In a transmission mechanism, the combination of a clutch, a clutch case, a change speed gearing in the rear of the clutch and spaced apart therefrom and including a case and shiftable members extending outside of the case and means for operating said members located between the clutch case and the gear case comprising a support carried by one of said cases.

2. In a transmission mechanism, the combination of a clutch, a clutch case, change speed gearing including a case and shiftable members extending outside the case toward the clutch case, means for operating said members comprising a support mounted on the rear wall of the clutch case between the clutch case and the change speed gear case.

3. In a transmission mechanism, the combination of a clutch, a clutch case, a change speed gearing including a case and shiftable members in the case and extending outside of the case toward the clutch case, the clutch including a shaft extending outside of the clutch case and connected to the drive shaft of the change speed gearing, and means for operating the shiftable members including a support carried by one of said cases and located at one side of the axis of the shaft.

4. In a transmission mechanism, the combination of a clutch, a clutch case, a change speed gearing including a case and shiftable members in the case and extending outside of the case toward the clutch case, the clutch including a shaft extending outside of the clutch case and connected to the drive shaft of the change speed gearing, and means for operating the shiftable members including a support carried by the rear wall of the clutch case at one side of the axis of said shaft.

5. In a transmission mechanism, the combination of a clutch, a clutch case, a change speed gearing including a case and shiftable members in the case and extending outside of the same toward the clutch case, the clutch including a shaft and the clutch case comprising a removable rear wall having a bearing for the shaft, said rear wall having a laterally extending bracket portion, and means for operating the shiftable members including a support detachably mounted on said bracket portion.

6. In a transmission mechanism, the combination of a clutch, a clutch case, a change speed gearing including a case and shiftable members in the case and extending outside of the same toward the clutch case, the clutch including a shaft extending outside of the clutch case and connected to the drive shaft of the change speed gearing, and means for operating the shiftable members including a support mounted on the rear wall of the clutch case at one side of the axis of said shaft, slide rods mounted in the support, a selecting and shifting lever carried by the support and connections between the slide rods and the shiftable members of the gearing.

7. In a transmission mechanism, the combination of a clutch, a clutch case, a change speed gearing including a case and shiftable members in the case and extending outside of the case toward the clutch case, the clutch including a shaft extending outside of the clutch case and connected to the drive shaft of the change speed gearing, means for operating the shiftable members including a support carried by the rear wall of the clutch case at one side of the axis of said shaft, selecting and shifting mechanism carried by the support, and a brake lever carried by the support between the support and the axis of said shaft.

8. In a transmission mechanism, the combination of a clutch, a clutch case, a change speed gearing including a case and shiftable members in the case and extending outside of the same toward the clutch case, the clutch including a shaft extending outside of the clutch case and connected to the drive shaft of the change speed gearing, means for operating the shiftable members including a support mounted on the rear wall of the clutch case at one side of the axis of said shaft, slide rods mounted in the support, a selecting and shifting lever carried by the support and connections between the slide rods and the shiftable members of the gearing, and a brake lever carried by the support and located between the support and the axis of said shaft.

In testimony whereof, I have hereunto signed my name at Syracuse, in the county of Onondaga, and State of New York, this 21st day of May, 1925.

HENRY W. SWEET.